(12) United States Patent
Gkinosatis

(10) Patent No.: US 9,789,669 B2
(45) Date of Patent: Oct. 17, 2017

(54) HEAT SHRINKABLE FILM

(71) Applicant: FLEXOPACK S.A., Koropi (GR)

(72) Inventor: Dimitris Gkinosatis, Koropi Attica (GR)

(73) Assignee: Flexopack S.A., Koropi (GR)

( * ) Notice: Subject to any disclaimer, the term of this patent is extended or adjusted under 35 U.S.C. 154(b) by 293 days.

(21) Appl. No.: 14/304,101

(22) Filed: Jun. 13, 2014

(65) Prior Publication Data

US 2015/0010764 A1    Jan. 8, 2015

(30) Foreign Application Priority Data

Jun. 14, 2013    (EP) .................................... 13172025

(51) Int. Cl.
| | |
|---|---|
| *B32B 27/08* | (2006.01) |
| *B32B 27/28* | (2006.01) |
| *B32B 27/32* | (2006.01) |
| *C08J 5/18* | (2006.01) |
| *B32B 27/30* | (2006.01) |

(52) U.S. Cl.
CPC .............. *B32B 27/08* (2013.01); *B32B 27/28* (2013.01); *B32B 27/304* (2013.01); *B32B 27/306* (2013.01); *B32B 27/32* (2013.01); *C08J 5/18* (2013.01); *B32B 2270/00* (2013.01); *B32B 2307/581* (2013.01); *B32B 2307/7244* (2013.01); *B32B 2307/736* (2013.01); *B32B 2439/70* (2013.01); *C08J 2331/04* (2013.01); *Y10T 428/31913* (2015.04)

(58) Field of Classification Search
None
See application file for complete search history.

(56) References Cited

U.S. PATENT DOCUMENTS

| | | | |
|---|---|---|---|
| 3,214,884 A | 11/1965 | Langdon | |
| 4,207,363 A | 6/1980 | Lustig | |
| 4,857,399 A * | 8/1989 | Vicik | ...................... B32B 27/08 |
| | | | 428/332 |
| 4,879,430 A | 11/1989 | Hoffman | |
| 4,948,657 A | 8/1990 | Ogawa et al. | |
| 5,382,470 A * | 1/1995 | Vicik | ...................... B32B 27/08 |
| | | | 428/334 |
| 6,058,998 A | 5/2000 | Kristen | |
| 6,065,272 A | 5/2000 | Lecomte | |
| 6,146,726 A | 11/2000 | Yoshii et al. | |
| 6,221,410 B1 | 4/2001 | Ramesh et al. | |
| 6,258,423 B1 | 7/2001 | Giori | |
| 6,274,246 B1 | 8/2001 | Eggers et al. | |
| 6,299,984 B1 | 10/2001 | Forloni | |
| 6,346,285 B1 | 2/2002 | Ramesh | |
| 6,406,763 B1 | 6/2002 | Wolf et al. | |
| 6,458,437 B1 | 10/2002 | Ito et al. | |
| 6,506,463 B1 | 1/2003 | Cahill et al. | |
| 6,514,583 B1 | 2/2003 | Ahlgren et al. | |
| 6,516,588 B2 | 2/2003 | Jensen et al. | |
| 6,531,198 B2 | 3/2003 | Lind et al. | |
| 6,534,137 B1 * | 3/2003 | Vadhar | ..................... B32B 27/32 |
| | | | 428/34.9 |
| 6,558,760 B1 | 5/2003 | Paleari et al. | |
| 6,572,959 B1 | 6/2003 | Buongiorno et al. | |
| 6,592,975 B1 | 7/2003 | Ueyama et al. | |
| 6,610,046 B1 | 8/2003 | Usami et al. | |
| 6,663,905 B1 | 12/2003 | Ennis et al. | |
| 6,682,792 B2 | 1/2004 | Schmal et al. | |
| 6,777,046 B1 | 8/2004 | Tatarka et al. | |
| 6,869,686 B1 * | 3/2005 | Idlas | ........................ B32B 7/12 |
| | | | 428/34.9 |
| 6,960,635 B2 | 11/2005 | Stevens et al. | |
| 6,984,695 B2 | 1/2006 | Brown et al. | |
| 7,473,473 B2 | 1/2009 | Verrocchi | |
| 7,611,770 B2 | 11/2009 | Kennedy et al. | |
| 7,736,726 B2 | 6/2010 | McAllister et al. | |
| 8,129,006 B2 | 3/2012 | Ginossatis | |
| 8,697,211 B2 | 4/2014 | Gkinosatis | |
| 9,290,320 B2 | 3/2016 | Gkinosatis | |
| 9,365,687 B2 | 6/2016 | Gkinosatis | |
| 9,440,788 B2 | 9/2016 | Gkinosatis | |
| 9,604,430 B2 | 3/2017 | Gkinosatis | |
| 2002/0038535 A1 | 4/2002 | Jensen et al. | |
| 2002/0066261 A1 | 6/2002 | Richards | |

(Continued)

FOREIGN PATENT DOCUMENTS

| | | |
|---|---|---|
| AU | 511 195 B2 | 7/1980 |
| EP | 0 005 660 | 11/1979 |

(Continued)

OTHER PUBLICATIONS

"Filling and sealing of containers" in Fellows, P.J. (2000). Food Processing Technology—Principles and Practice (2nd Edition). Woodhead Publishing.

Advisory Action corresponding to U.S. Appl. No. 12/319,150 dated Nov. 13, 2013.

Annonymous, "Advantages of metallocene ethylene [olymer resins in multilayer stretch films," Research Disclosure, Mason Publications, Hampshire, GB. vol. 419, No. 26 (1999).

Annonymous, "Some benefits from the use of metallocene ethylene polymers in blown and cast films," Research Disclosure, Mason Publications, Hampshire, GB. vol. 392, No. 54 (1996).

(Continued)

*Primary Examiner* — Sheeba Ahmed

(74) *Attorney, Agent, or Firm* — Jenkins, Wilson, Taylor & Hunt, P.A.

(57) ABSTRACT

The present invention refers to a multilayer heat shrinkable film characterized by a combination of desirable properties, such as high shrinkage, good optical properties, excellent sealability and puncture resistance. The invention further is directed to a method of producing said film. The invention is further directed to the use of said film or bags and pouches made therefrom for packaging goods as for example food products.

10 Claims, No Drawings

(56) References Cited

U.S. PATENT DOCUMENTS

| | | |
|---|---|---|
| 2002/0119334 A1 | 8/2002 | Shepard et al. |
| 2002/0172834 A1 | 11/2002 | Rivett et al. |
| 2003/0008084 A1 | 1/2003 | Vicik et al. |
| 2003/0012900 A1 | 1/2003 | Wolf et al. |
| 2003/0073785 A1 | 4/2003 | Okada et al. |
| 2003/0124452 A1 | 7/2003 | Nair et al. |
| 2003/0213804 A1 | 11/2003 | Chomik et al. |
| 2003/0218022 A1 | 11/2003 | Chomik et al. |
| 2003/0220453 A1 | 11/2003 | Ebara et al. |
| 2004/0020175 A1 | 2/2004 | Stravitz |
| 2004/0020913 A1 | 2/2004 | Hovorka |
| 2004/0043238 A1 | 3/2004 | Wuest et al. |
| 2004/0048086 A1 | 3/2004 | Kennedy et al. |
| 2004/0065052 A1 | 4/2004 | Ramesh et al. |
| 2004/0074904 A1 | 4/2004 | Share et al. |
| 2004/0157077 A1 | 8/2004 | Roussos |
| 2004/0159972 A1 | 8/2004 | Koschmieder et al. |
| 2004/0194433 A1 | 10/2004 | Chomik et al. |
| 2005/0044819 A1 | 3/2005 | Chomik et al. |
| 2005/0064123 A1 | 3/2005 | Chomik et al. |
| 2005/0129811 A1 | 6/2005 | Kraimer et al. |
| 2005/0147778 A1 | 7/2005 | Tai et al. |
| 2005/0191439 A1 | 9/2005 | Hirose et al. |
| 2005/0235611 A1 | 10/2005 | Roussos |
| 2005/0239961 A1 | 10/2005 | Saraf et al. |
| 2005/0271877 A1 | 12/2005 | Ginossatis |
| 2006/0010837 A1 | 1/2006 | Jurus |
| 2006/0172143 A1 | 8/2006 | Breese et al. |
| 2006/0177616 A1 | 8/2006 | Barber et al. |
| 2006/0177641 A1 | 8/2006 | Breese et al. |
| 2006/0199030 A1 | 9/2006 | Liang et al. |
| 2006/0199912 A1 | 9/2006 | Fuchs et al. |
| 2006/0254219 A1 | 11/2006 | Alipour et al. |
| 2006/0272767 A1 | 12/2006 | Kreitman et al. |
| 2006/0283153 A1 | 12/2006 | Nakano |
| 2006/0286323 A1 | 12/2006 | Siegel et al. |
| 2007/0042089 A1 | 2/2007 | Grah |
| 2007/0082150 A1 | 4/2007 | Ginossatis |
| 2007/0089688 A1 | 4/2007 | Nitzsche et al. |
| 2007/0178285 A1 | 8/2007 | Rasanen et al. |
| 2008/0003332 A1 | 1/2008 | Ginossatis |
| 2008/0070047 A1 | 3/2008 | Rehkugler et al. |
| 2008/0095960 A1 | 4/2008 | Schell et al. |
| 2008/0115463 A1 | 5/2008 | Wilson |
| 2008/0255311 A1 | 10/2008 | Chang et al. |
| 2008/0274314 A1 | 11/2008 | Gkinosatis |
| 2008/0274328 A1 | 11/2008 | Gkinosatis |
| 2008/0305220 A1 | 12/2008 | Gkinosatis |
| 2009/0013656 A1 | 1/2009 | Nasiatka et al. |
| 2009/0176117 A1 | 7/2009 | Gkinosatis |
| 2009/0191392 A1 | 7/2009 | Gkinosatis |
| 2009/0196962 A1 | 8/2009 | Gkinosatis |
| 2009/0240227 A1 | 9/2009 | Toro et al. |
| 2009/0263599 A1 | 10/2009 | Gkinosatis |
| 2010/0028574 A1 | 2/2010 | Gkinosatis |
| 2010/0032098 A1 | 2/2010 | Lalli et al. |
| 2010/0034939 A1 | 2/2010 | Gkinosatis |
| 2010/0221391 A1 | 9/2010 | Deng et al. |
| 2011/0159263 A1 | 6/2011 | Gkinosatis |
| 2012/0279181 A1 | 11/2012 | Gkinosatis |
| 2012/0289645 A1 | 11/2012 | Tice et al. |
| 2013/0019568 A1 | 1/2013 | Gkinosatis |
| 2013/0209797 A1 | 8/2013 | Gkinosatis |
| 2013/0227916 A1 | 9/2013 | Gkinosatis |
| 2015/0210454 A1 | 7/2015 | Gkinosatis |
| 2016/0176612 A1 | 6/2016 | Gkinosatis |
| 2016/0236862 A1 | 8/2016 | Gkinosatis |

FOREIGN PATENT DOCUMENTS

| | | |
|---|---|---|
| EP | 0 286 407 | 10/1988 |
| EP | 0 402 043 | 12/1990 |
| EP | 0 472 418 | 2/1992 |
| EP | 0 627 465 | 12/1994 |
| EP | 0 810 087 | 12/1997 |
| EP | 1 072 632 A2 | 1/2001 |
| EP | 0 930 349 B1 | 6/2003 |
| EP | 1 060 077 | 6/2003 |
| EP | 1 131 205 | 12/2004 |
| EP | 1 514 680 A1 | 3/2005 |
| EP | 1 415 930 | 4/2006 |
| EP | 1 770 116 A1 | 4/2007 |
| EP | 1 854 625 A1 | 11/2007 |
| EP | 08162162.5 | 8/2008 |
| EP | 1 985 440 A2 | 10/2008 |
| EP | 1 985 443 A2 | 10/2008 |
| EP | 1 995 058 A1 | 11/2008 |
| EP | 2 007 239 A2 | 7/2009 |
| EP | 2 007 297 A1 | 7/2009 |
| EP | 2 085 216 A1 | 8/2009 |
| EP | 2 111 979 A2 | 10/2009 |
| EP | 2 147 783 A1 | 1/2010 |
| GB | 792290 | 3/1958 |
| GB | 1 140 765 | 1/1969 |
| GB | 2 236 531 | 4/1991 |
| JP | 62107810 A | 5/1987 |
| JP | 03 200534 | 9/1991 |
| JP | 07196818 | 8/1995 |
| JP | 07206004 | 8/1995 |
| JP | 07206005 | 8/1995 |
| JP | 07206006 | 8/1995 |
| JP | 2002-234975 | 8/2002 |
| JP | 2003-159761 | 6/2003 |
| JP | 2005-047959 | 2/2005 |
| JP | 2005-335111 | 12/2005 |
| JP | 2006-247870 | 9/2006 |
| NZ | 567768 | 11/2009 |
| NZ | 567767 | 5/2010 |
| WO | WO96/01736 | 1/1996 |
| WO | WO 97/12758 A1 | 4/1997 |
| WO | WO97/46384 | 12/1997 |
| WO | WO98/21274 | 5/1998 |
| WO | WO98/21276 | 5/1998 |
| WO | WO99/44824 | 9/1999 |
| WO | WO99/57612 | 11/1999 |
| WO | WO00/61439 | 10/2000 |
| WO | WO01/23268 | 4/2001 |
| WO | WO02/26493 | 4/2002 |
| WO | WO03/020515 | 3/2003 |
| WO | WO2006/053885 | 5/2006 |
| WO | WO2006/075141 | 7/2006 |
| WO | WO2006/102152 | 9/2006 |
| WO | WO2007/053603 | 5/2007 |
| WO | WO2008/091321 | 7/2008 |
| WO | WO2008/118554 | 10/2008 |
| WO | WO 2011/029597 | 3/2011 |

OTHER PUBLICATIONS

ASTM D 1003-07 "Haze and Luminous Transmittance of Transparent Plastics," ASTM International. pp. 1-7.

ASTM D 1525-07 "Vicat Softening Temperature of Plastics," ASTM International. pp. 1-9.

ASTM D 2732-03 "Unrestrained Linear Thermal Shrinkage of Plastic Film and Sheeting," ASTM International. pp. 1-5.

ASTM D3418-08. Standard Test Method for Transition Temperatures and Enthalpies of Fusion and Crystallization of Polymers by Differential Scanning Calorimetry. American National Standards Institute. Dec. 2008. www.astm.org.

ASTM D3985. Standard Test Method for Oxygen Gas Transmission Rate Through Plastic Film and Sheeting Using a Coulometric Sensor. American National Standards Institute. pp. 1-7. www.astm.org.

ASTM D882-09. Standard Test Method for Tensile Properties of Thin Plastic Sheeting. American National Standards Institute. Jan. 2009. www.astm.org.

ASTM F1927-07. Standard Test Method for Determination of Oxygen Gas Transmission Rate, Permeability and Permeance at Controlled Relative Humidity Through Barrier Materials Using a Coulometric Detector. American National Standards Institute. Aug. 2007. www.astm.org.

BS 2782-0:2004 "Methods of Testing Plastics," British Standards Institution. pp. 1-29 (2004).

(56) References Cited

OTHER PUBLICATIONS

English abstract of JP 2005-103902, USUI, Apr. 2005.
European Search Report corresponding to European Patent Application No. 08173056.6-2109 dated Mar. 16, 2009.
European Search Report corresponding to European Patent Application No. 08173057.4-2307 dated Sep. 22, 2009.
Extended European Search Report corresponding to European Patent Application No. 05021541.7-2115 dated Dec. 2, 2005.
Extended European Search Report corresponding to European Patent Application No. 08154742.4-2124 dated Jul. 2, 2009.
Extended European Search Report corresponding to European Patent Application No. 08156814 dated Oct. 9, 2008.
Extended European Search report corresponding to European Patent Application No. 09151289.7-2124 dated Jun. 8, 2009.
Extended European Search Report corresponding to European Patent Application No. 10193414.9-1217 dated May 9, 2011.
Harper, "Modern Plastics Handbook," McGraw-Hill: New York, New York. pp. 3.17-3.22 (2000).
Hough, M., and Dolbey, R., "Modern Plastics Compendium, vol. 1—Key Properties and Sources," Smithers Rapra Technology. pp. 87-124 (1995).
Huskić, M., and Šebenik, A., "Characterization of Crosslinked Ethylene-Vinylacetate Copolymers," Polymer International. vol. 31, No. 1 pp. 41-44 (1993).
Interview Summary corresponding to U.S. Appl. No. 11/801,609, dated Jul. 31, 2012.
Interview Summary corresponding to U.S. Appl. No. 12/150,261, dated Dec. 28, 2010.
Interview Summary corresponding to U.S. Appl. No. 12/150,261, dated Jun. 12, 2012.
Interview Summary corresponding to U.S. Appl. No. 12/150,261, dated Sep. 21, 2011.
Interview Summary corresponding to U.S. Appl. No. 12/319,149, dated Jun. 15, 2012.
Interview Summary corresponding to U.S. Appl. No. 12/319,149, dated Oct. 17, 2011.
Interview Summary corresponding to U.S. Appl. No. 12/319,150, dated Sep. 23, 2011.
Interview Summary corresponding to U.S. Appl. No. 12/319,150, dated Sep. 6, 2013.
Interview Summary corresponding to U.S. Appl. No. 12/322,347, dated Sep. 21, 2011.
Interview Summary corresponding to U.S. Appl. No. 12/508,233, dated Apr. 26, 2012.
Kipp, "Plastic Material Data Sheets," MatWeb (2004) (5 pages).
Machine Translation of JP 2005-103902, USUI, Apr. 2005.
Notice of Allowance corresponding to U.S. Appl. No. 11/528,741 dated Oct. 28, 2011.
Notice of Allowance corresponding to U.S. Appl. No. 12/150,168 dated Nov. 25, 2013.
Official action corresponding to European Patent Application No. 10 193 414.9-1303 dated Oct. 29, 2014.
Official Action corresponding to New Zealand Patent Application No. 626181 dated Jun. 18, 2014.
Official Action corresponding to U.S. Appl. No. 11/528,741 dated Jan. 4, 2011.
Official Action corresponding to U.S. Appl. No. 11/528,741 dated Mar. 30, 2010.
Official Action corresponding to U.S. Appl. No. 11/528,741 dated May 18, 2011.
Official Action corresponding to U.S. Appl. No. 11/801,609 dated Feb. 5, 2010.
Official Action corresponding to U.S. Appl. No. 11/801,609 dated Jan. 30, 2012.
Official Action corresponding to U.S. Appl. No. 11/801,609 dated Jul. 15, 2010.
Official Action corresponding to U.S. Appl. No. 11/801,609 dated Jun. 12, 2015.
Official Action corresponding to U.S. Appl. No. 11/801,609 dated Jun. 20, 2011.
Official Action corresponding to U.S. Appl. No. 11/801,609 dated Nov. 29, 2013
Official Action corresponding to U.S. Appl. No. 11/801,609 dated Sep. 15, 2009.
Official Action corresponding to U.S. Appl. No. 11/801,609 dated Sep. 24, 2014.
Official Action corresponding to U.S. Appl. No. 12/150,168 dated Apr. 26, 2013.
Official Action corresponding to U.S. Appl. No. 12/150,168 dated Aug. 14, 2012.
Official Action corresponding to U.S. Appl. No. 12/150,168 dated Feb. 16, 2011.
Official Action corresponding to U.S. Appl. No. 12/150,168 dated Sep. 23, 2011.
Official Action corresponding to U.S. Appl. No. 12/150,261 dated Jan. 31, 2012.
Official Action corresponding to U.S. Appl. No. 12/150,261 dated Jul. 7, 2010.
Official Action corresponding to U.S. Appl. No. 12/150,261 dated Mar. 22, 2011.
Official Action corresponding to U.S. Appl. No. 12/150,261 dated Oct. 27, 2009.
Official Action corresponding to U.S. Appl. No. 12/154,662 dated Aug. 18, 2011.
Official Action corresponding to U.S. Appl. No. 12/154,662 dated Jan. 18, 2012.
Official Action corresponding to U.S. Appl. No. 12/154,662 dated Mar. 29, 2011.
Official Action corresponding to U.S. Appl. No. 12/319,149 dated Aug. 27, 2012.
Official Action corresponding to U.S. Appl. No. 12/319,149 dated Dec. 2, 2011.
Official Action corresponding to U.S. Appl. No. 12/319,149 dated Jul. 7, 2010.
Official Action corresponding to U.S. Appl. No. 12/319,149 dated Mar. 22, 2011.
Official Action corresponding to U.S. Appl. No. 12/319,149 dated Oct. 15, 2009.
Official Action corresponding to U.S. Appl. No. 12/319,150 dated Apr. 26, 2011.
Official Action corresponding to U.S. Appl. No. 12/319,150 dated Jul. 22, 2015.
Official Action corresponding to U.S. Appl. No. 12/319,150 dated Mar. 14, 2013.
Official Action corresponding to U.S. Appl. No. 12/319,150 dated Nov. 4, 2011.
Official Action corresponding to U.S. Appl. No. 12/319,150 dated Oct. 15, 2010.
Official Action corresponding to U.S. Appl. No. 12/322,347 dated Aug. 1, 2014.
Official Action corresponding to U.S. Appl. No. 12/322,347 dated Mar. 16, 2011.
Official Action corresponding to U.S. Appl. No. 12/322,347 dated May 15, 2012.
Official Action corresponding to U.S. Appl. No. 12/322,347 dated May 20, 2015.
Official Action corresponding to U.S. Appl. No. 12/322,347 dated Oct. 26, 2011.
Official Action corresponding to U.S. Appl. No. 12/322,347 dated Sep. 14, 2010.
Official Action corresponding to U.S. Appl. No. 12/426,496 dated Feb. 7, 2012.
Official Action corresponding to U.S. Appl. No. 12/508,233 dated Jun. 6, 2012.
Official Action corresponding to U.S. Appl. No. 12/508,233 dated Mar. 9, 2011.
Official Action corresponding to U.S. Appl. No. 12/508,233 dated Nov. 23, 2011.
Official Action corresponding to U.S. Appl. No. 12/512,361 dated Aug. 31, 2011.
Official Action corresponding to U.S. Appl. No. 12/512,361 dated May 2, 2012.

(56) References Cited

OTHER PUBLICATIONS

Official Action corresponding to U.S. Appl. No. 12/957,947 dated Apr. 24, 2014.
Official Action corresponding to U.S. Appl. No. 12/957,947 dated Jan. 17, 2012.
Official Action corresponding to U.S. Appl. No. 12/957,947 dated Jan. 7, 2015.
Official Action corresponding to U.S. Appl. No. 12/957,947 dated Jul. 24, 2013.
Official Action corresponding to U.S. Appl. No. 12/957,947 dated Sep. 16, 2015.
Official Action corresponding to U.S. Appl. No. 12/957,947 dated Sep. 25, 2012.
Official Action corresponding to U.S. Appl. No. 13/157,876 dated Jun. 2, 2014.
Official Action corresponding to U.S. Appl. No. 13/157,876 dated Mar. 3, 2015.
Official Action corresponding to U.S. Appl. No. 13/157,876 dated Nov. 19, 2013.
Official Action corresponding to U.S. Appl. No. 13/523,462 dated Jan. 30, 2015.
Official Action corresponding to U.S. Appl. No. 13/523,462 dated Sep. 21, 2015.
Official Action corresponding to U.S. Appl. No. 13/682,160 dated Jun. 15, 2015.
Official Action corresponding to U.S. Appl. No. 13/722,323 dated Jan. 7, 2015.
Official Action corresponding to U.S. Appl. No. 13/722,323 dated Jul. 17, 2015.
Official Action corresponding to U.S. Appl. No. 13/722,323 dated Mar. 27, 2014.
Official Action corresponding to United Kingdom Patent Application No. GB1020302.4 dated Dec. 11, 2014.
Official Action corresponding to United Kingdom Patent Application No. GB1020302.4 dated Jul. 2, 2014.
Oxygen Trasnmission Rate of various polymers verses relative humidity at 20° C. (1 page).
Petrie, "Handbook of Adhesives and Sealants," 2nd Edition. McGraw-Hill: New York, New York. pp. 465-466 (2007).
Search Report corresponding to French Patent Application No. 1059997 dated Jan. 16, 2012.
Unisource—Moisture Barrier & Oxygen Barrier Transmission Rates; <http://www.unisourcelink.com/packaging/pdf/MoistureBarrier.pdf> (Retrieved on Jan. 10, 2012).
"15.13×EA—Ethylene Vinyl Acetate (EVA) Copolymers (>50% Ethylene)—European Adhesives,"The ChemQuest Group, Inc. http://web.archive.org/web/20080219220919/http://www.chemquest.com/store/ethylene-vinyl-acetate-copolymers-european-adhesives.html (Aug. 26, 2011) (2 pages).
"Baymod L 2450," Product Data Sheet, LANXESS. (2 pages) (2007).
"DuPontTM Elvax® 3170," DuPont Packaging & Industrial Polymers. 3 pages (2004) http://web.archive.org/web/20060516114601/http://www2.dupont.com/Elvax/en_US/assets/downloads/vax3170.pdf.
"Elvaloy resins," Product Data Sheet, DuPont Packaging & Industrial Polymers. (2 pages) (2010).
"Polybutylene terephthalate (PBT)," 1 page <http://www.britannica.com/EBchecked/topic/468341/polybutylene-terephthalate-PBT> (Accessed on Jun. 13, 2012).
"Polybutylene terephthalate," Britannica Online Encyclopedia. pp. 1-3 (Accessed on Sep. 7, 2011) <http://www.britannica.com/EBchecked/topic/468341/polybutylene-terephthalate-PBT>.
"Polymer Blend," IUPAC Compendium of Chemical Terminology. 2nd Edition (1997).
Advisory Action corresponding to U.S. Appl. No. 11/801,609 dated Jun. 16, 2016.
Interview Summary corresponding to U.S. Appl. No. 13/722,323 dated Jan. 22, 2016.
Interview Summary corresponding to U.S. Appl. No. 13/682,160 dated Oct. 28, 2016.
Notice of Allowance corresponding to U.S. Appl. No. 13/157,876 dated Nov. 12, 2015.
Notice of Allowance correspoding to U.S. Appl. No. 12/319,150 dated Feb. 12, 2016.
Notice of Allowance corresponding to U.S. Appl. No. 13/523,462 dated May 16, 2016.
Official Action corresponding to U.S. Appl. No. 14/612,175 dated Dec. 9, 2015.
Official Action corresponding to U.S. Appl. No. 13/682,160 dated Jan. 29, 2016.
Official Action corresponding to U.S. Appl. No. 11/801,609 dated Feb. 2, 2016.
Official Action corresponding to U.S. Appl. No. 12/322,347 dated Feb. 18, 2016.
Official Action corresponding to U.S. Appl. No. 12/957,947 dated Mar. 31, 2016.
Official Action corresponding to U.S. Appl. No. 13/722,323 dated May 3, 2016.
Official Action corresponding to U.S. Appl. No. 13/682,160 dated Jun. 30, 2016.
Official Action corresponding to U.S. Appl. No. 14/612,175 dated Aug. 5, 2016.
Official Action corresponding to U.S. Appl. No. 12/322,347 dated Aug. 17, 2016.
Official Action corresponding to U.S. Appl. No. 12/957,947 dated Sep. 26, 2016.
"Polymer Materials Selection for Radiation-Sterilized Products," pp. 1-3 <http://www.mddionline.com/article/polymer-materials-selection-radiation-sterilized-products> dated Feb. 1, 2000.
Advisory Action, Examiner Initiated Interview Summary, and AFCP 2.0 Decision corresponding to U.S. Appl. No. 14/612,175 dated Jan. 4, 2017.
Kerns, "What's the Difference Between Batteries and Capacitors?" Machine Design, Batteries/Power Supplies, pp. 1-4 (May 11, 2015).
Notice of Allowance corresponding to U.S. Appl. No. 13/722,323 dated Nov. 18, 2016.
Notice of Decision from Post-Prosectuion Pilot Program (P3) Conference corresponding to U.S. Appl. No. 12/957,947 dated Dec. 14, 2016.
Official Action corresponding to U.S. Appl. No. 11/801,609 dated Nov. 16, 2016.
Official Action corresponding to U.S. Appl. No. 13/682,160 dated Mar. 2, 2017.
Pish, "Ragone Plot," 2016 Advisory Panel Energy Storage, Center for Electromechanics, The University of Texas at Austin http://utw10356.utweb.utexas.edu/sites/default/files/Pish.pdf, p. 1, (May 10, 2016).
Scherson et al., "Batteries and Electrochemical Capacitors," The Electricochemical Society Interface, pp. 17-22 (2006).
"Ragone Chart," Wikipedia, http://en.wikipedia.org/wiki/Ragone_chart, pp. 1-2, downloaded Dec. 21, 2016.

* cited by examiner

HEAT SHRINKABLE FILM

The present U.S. patent application claims priority to European Patent Application No. 13172025.2, filed Jun. 14, 2013, the disclosure of which is incorporated herein by reference in its entirety.

The present invention refers to a multilayer heat shrinkable film characterized by a combination of desirable properties, such as high shrinkage, good optical properties, excellent sealability and puncture resistance. The invention further is directed to a method of producing said film. The invention is further directed to the use of said film or bags and pouches made therefrom for packaging goods as for example food products.

Generally, the packaging of food items by means of a heat shrinkable bag comprises the following steps 1. Putting the food item inside the bag and removing the air (vacuumising) with the help of a vacuum device.
2. Sealing of the open end of the bag.
3. Placing the vacuum pack in a heat shrinking media such as hot water under a temperature that ensures the shrink of the pack (eg 90° C.).
4. The pack is ready and is characterized by appealing appearance and long shelf life because of the absence of oxygen.

These films need high shrink properties and good optics to ensure an excellent appearance and excellent sealability so that there is no entrance of oxygen to the pack as this would be detrimental for the shelf life of the food.

In some cases, where the food is stored in frozen conditions for example, there is the possibility to use a non gas barrier film. The other characteristics remain the same.

Packaging films with the above properties are well known in the art.

A problem that is often found in the art is that during the packaging process there is too much abuse of the packed bags by the production and transportation process. Therefore it is common to have punctured bags that result in lowering the process yield and increasing the process scrap.

A further problem encountered in the art is the exudation of meat liquids in the internal bag area. This makes the bag look messy and unattractive to the consumer.

A further problem is the need for high heat shrinkage of the bag at temperatures lower than 90° C. Such temperatures (eg 80-85° C.) are often used as 90° C. are sometimes considered too much for fresh meat packing.

SUMMARY OF THE INVENTION

The present invention refers to a heat shrinkable film combining the following desirable quantities.

1. Heat shrinkage at 85° C. is at least 40% in at least one of each of machine and transverse directions where the shrinkage is measured according to ASTM D 2732.
2. High puncture resistance which increases by immersing the material in hot water bath by at least 100%.
3. Very good optics These desirable attributes are achieved with a film that comprises an outer layer comprising an ionomer, preferably with an acid content of at least 15 weight % comprises a heat sealing layer (inner layer) comprising at least one ethylene alpha olefin copolymer with a density less than 0.905 g/cc.

Definitions

In this application the following definitions are used:

The term "film" refers to a flat or tubular flexible structure of thermoplastic material.

The term "heat shrinkable" refers to a film that shrinks at least 10% in at least one of the longitudinal and transverse directions (TD) when heated at 90° C. for 4 seconds. The shrinkability is measured according to ASTM D 2732.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed. This is also called "sealing layer" as this layer must be hermetically sealed in order to protect the product from ingress of air.

The phrase "intermediate layer" refers to any layer of the film that is neither outer nor inner layer. A film may comprise more than one intermediate layers.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalysed polymers and polyethylene plastomers and elastomers.

In these cases the alpha olefin can be propene, butene, hexene, octene etc as known in the art.

As used herein the term "homogeneous ethylene alpha olefin copolymers" refer to ethylene alpha olefin copolymers having a molecular weight distribution less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40% per weight.

As used herein the phrase "ethylene vinyl acetate copolymer" refers to copolymers of ethylene and vinyl acetate.

As used herein, the term EVOH refers to saponified products of ethylene vinyl ester copolymers. The ethylene content is typically in the range of 25 to 50% per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term polyamide refers to homopolymers and copolymers.

As used herein the term "ionomer" refers to ethylene-acid copolymers which have been neutralized by metals such as sodium, zinc, lithium or others.

The acid used is usually methacrylic or acrylic acid.

As used herein the term "polybutylene" refers to butene-1 homopolymers and copolymers. Useful copolymers comprise ethylene mer units. Ethylene content should be generally less than 50% per weight.

All measurement methods mentioned herein are readily available for the skilled person. For example, they can be obtained from the American National Standards Institute at: www.webstore.ansi.org All percentages used are per weight unless stated otherwise.

DETAILED DESCRIPTION OF THE INVENTION

According to a first aspect, the invention is directed to a heat shrinkable film whose puncture resistance is increased by at least 100% by immersion in hot water 90° C. for 4 seconds in a way that the thickness of the film before and after immersion has a maximum difference of 3%.

In a preferred embodiment, the film according to the invention comprises an outer layer, an intermediate layer and an inner layer, where the outer layer surface of the film comprises an ionomer with acid content of at least 10 weight % and the inner layer comprises an ethylene alpha olefin copolymer with density less than 0.905 g/cc.

According to a preferred version of the invention, the ionomer resin comprises at least 15 weight % of methacrylic or acrylic acid.

According to a further preferred version of the invention the ionomer resin is at least 20% neutralized, more preferably at least 50% neutralized. In a further preferred version the ionomer is neutralized with sodium cation.

According to a further preferred version, the outer layer comprises at least 90% ionomer per weight, more preferably at least 95%.

According to a further preferred version the outer layer comprises less than (and up to) 5 wt % of polybutylene. Above 5 wt % the material becomes difficult to stretch.

According to a further preferred version the outer layer comprises slip and/or antiblock agents. Preferably the slip and antiblock agents are provided as a masterbatch where the host polymer is ionomer or ethylene acrylic acid copolymer or ethylene methacrylic acid copolymer.

In the film according to the present invention, the inner heat sealing layer may comprise a single polyolefin or a blend of different polyolefins. In a preferred version of the structure, the sealing layer comprises at least one homogeneous polyolefin.

In a further preferred version the sealing layer comprises a homogeneous ethylene alpha olefin copolymer with a density of less than 0.905 g/cc.

In a further preferred version the sealing layer comprises a homogeneous alpha olefin copolymer with a density of less than 0.900 g/cc.

In a further version the inner layer comprises a blend of two ethylene alpha olefin copolymers with a density of less than 0.905 g/cc In another version of the invention the inner layer comprises a blend of two homogeneous ethylene alpha olefin copolymers which have both densities less than 0.900 g/cc.

In a further preferred version of the invention the inner layer does not comprise EVA. The reason is that addition of EVA deteriorates the resistance of the heat seal of the bag during the shrink process. In another version the percentage of the EVA in the inner layer blend is less than 50% per weight, preferably less than 40% per weight.

In a preferred version of the invention, the multilayer film comprises an oxygen barrier material, preferably PVDC, EVOH, polyamide or polyester.

Preferably the oxygen barrier material is located in an intermediate layer of the film.

In general PVDC is preferred as barrier material for the invention due to its insensitiveness under high humidity conditions which are often encountered in meat packing operations. EVOH can be used as well but is more sensitive to humidity Between the sealing layer and the oxygen barrier layer, a tie layer could be used. Preferred materials for this tie layer may be ethylene ester copolymers, such as ethylene vinyl acetate copolymers, ethylene methyl acrylate copolymers and other materials well known in the art. A preferred version might include maleic anhydrite modified ethylene ester copolymers or maleic anhydrite modified LLDPE. Commercial trademarks are for example BYNEL® from Dupont and ADMER® from Mitsui.

Between the outer and the barrier layer there may be another layer incorporating a tie layer. Preferred materials for this tie layer may be ethylene ester copolymers, such as ethylene vinyl acetate copolymers, ethylene methyl acrylate copolymers and other materials well known in the art. A preferred version might include maleic anhydrite modified ethylene ester copolymers or maleic anhydrite modified LLDPE. Commercial trademarks are for example BYNEL® from Dupont and ADMER® from Mitsui.

A further preferred option for the intermediate layers is a blend of EVA and propylene ethylene copolymer.

A preferred construction of the multilayer film is as follows

Outer layer-intermediate layer-barrier layer-intermediate layer-inner layer Other preferred constructions are as follows.

Outer layer-intermediate layer 1-intermediate layer 2-barrier layer-intermediate layer 3-intermediate layer 4-inner layer Any of the layers described above may also include additives well known in the art such as slip agents, antiblock, polymer processing aids, antistatic, antifog, acid scavengers, odour scavengers and the like. A person skilled in the art may select the right additives according to any particular needs.

The thickness of the film is preferably in the range 10 to 150 microns, more preferably 20 to 120 microns. The thickness of the outer layer is preferably from 1 to 50 microns, more preferably 3 to 25 microns. The thickness of the inner layer is preferably 5 to 100 microns, more preferably 10 to 60 microns.

In order the material to have a high shrinkability at 85° C., it is needed to be biaxially oriented either by using the double bubble process or the tenter frame process.

Both processes are well known in the art. The double bubble process is especially preferred.

In a further aspect of the invention the film or some layers of the film are irradiated. A preferable method is e-beam or UV radiation or gamma ray. Other methods are also known in the art.

According to a further aspect, the present invention discloses a bag or pouch comprising a film according to the present invention.

In a further aspect, the invention is directed to the use of the films or the bag or pouch of the invention for packaging food. For example, the food item is put inside the bag and the air is removed (vacuumising) with the help of a vacuum device. Subsequently, the open end of the bag is sealed and the vacuum pack is placed in a heat shrinking media such as hot water under a temperature that ensures the shrink of the pack (eg 90° C.). The pack than is ready and is characterized by appealing appearance and long shelf life because of the absence of oxygen.

The present invention is now described by the following Examples:

Examples

A 5 layer film is produced in a double bubble (the double bubble method is described in U.S. Pat. No. 3,456,044) commercial line with the following recipe
Inner (sealing layer), 56% P1+40% P2+4% additives
Adjacent layer 70% E1+30% PP1
Barrier layer PVDC commercial grade
Adjacent layer 70% E2+30% PP1
Outer layer 95% I1+5% ADDITIVES
See table 1
The thickness of the structure is 23/9/5/9/8 starting from the inner and going to the outer layer.

TABLE 1

| Type | Description | Manufacturer | Melt Index g/10 min | Density g/cm³ | Melting point ° C. |
|---|---|---|---|---|---|
| E1 | EVA | Polimeri FC45 | 0.3 | 0.935 | 93° C. |
| E2 | EVA | Polimeri FD50 | 0.4 | 0.938 | 88° C. |
| PP1 | PP copolymer | Dow | | 0.885 | |
| I1 | Ionomer with acid content 15% | DUPONT | 0.9 | 0.94 | 94° C. |
| P1 | AFFINITY PF1140 | DOW | 1.6 | 0.896 | 94° C. |
| P2 | TAFMER 4085 | MITSUI | 3.5 | 0.885 | Less than 70° C. |

The inventive material is compared to an already existing product named TRF 55 which does not comprise ionomer in the outer layer.
Tests
1. Haze measurement. The haze measurement was done according to ASTM D 1003.
2. Gloss measurement. This was done according to BS 2782.
3. Shrinkage measurement done according to ASTM D 2732 at 85° C.
4. Puncture resistance test.
   Puncture resistance is measured using a MECMESIN instrument comprising a vertical stand VERSA TEST, a load cell AFG 100N, which is mounted on the stand, and a digital height gauge MITUTOYO SDV 60B. A cylindrical shaft ending to a conical indenter is attached to the load cell. The indenter has an angle of 60° and a tip of 0.5 mm in diameter.
   The film is conditioned at 23° C. and about 50% RH for at least 24 hours prior to the measurement. Square samples of 8.5 cm×8.5 cm are prepared and clamped on a 5 cm diameter circular base. The indenter moves perpendicular to the film and force is measured as the indenter comes into contact with and ruptures the film. The speed of the indenter is set to 25 mm/min. Maximum force needed to puncture the film is recorded. The puncture force of a material is determined by averaging the values obtained for at least 5 samples of the material tested.
5. Puncture resistance test at restrained shrinkage sample.
   In order to obtain an area of a film that has undergone restrained shrinkage, we use the following procedure:
   i) We take a 250×200 bag of the material under question.
   ii) We measure the thickness of the material at an area about 8 cm below the open end of the bag.
   iii) We put inside the bag a cylinder, which is 4 cm high and has a diameter of 14 cm.
   iv) We vacuum the package using a vacuum chamber and seal it about 2 cm from the open end of the bag.
   v) We place the package obtained in a shrink bath heated at a temperature of 90° C. for 4 seconds.
   vi) After the shrinkage of the package, we open the bag, take the cylinder out and cut a piece of the material at the same area where we had originally measured thickness. The two thickness measurements should be identical (so average thickness difference should be less than 3%), as the material has not been shrunk at this specific area, since it has undergone restrained shrinkage.

TABLE 2

| | HAZE | GLOSS | SHRINKAGE (M D/TD) 85 C. | PUNCTURE RESISTANCE IN UNSHRUNK FILM | PUNCTURE RESISTANCE IN RESTRAINED SHRUNK FILM |
|---|---|---|---|---|---|
| Inventive material | 9 | 108 | 47/52 | 11 Newtons | 27 Newtons |
| TRF 55 | 9 | 110 | 53/40 | 15 Newtons | 21 Newtons |

Therefore one can see that the inventive material is similar to TRF 55 in optics, has much bigger shrinkability in 85° C. conditions and presents an increase in puncture at least 100% after restrained shrinkage in pieces with same thickness (difference of average thicknesses before and after immersion in water is less than 1%).

Thickness of the inventive film before immersion was 55.2 microns and after immersion 55.5 microns whereas the thickness of TRF 55 before immersion was 56 microns while after immersion was 56.3 microns.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A heat shrinkable, co-extruded film whose puncture resistance is increased by at least 100% by immersion in hot water 90° C. for 4 seconds in a way that the thickness of the film before and after immersion has a maximum difference of 3%, comprising:
   (i) an outer layer comprising an ionomer with acid content of at least 10% per weight;
   (ii) an intermediate layer;
   (iii) an inner layer comprising an ethylene alpha olefin copolymer with density less than 0.905 g/cc; and
   (iv) an oxygen barrier material layer,
   wherein shrinkage at 85° C. in each of the machine and transverse directions of the heat shrinkable film is at least 40%.

2. The film of claim 1, wherein the intermediate layer comprises EVA.

3. The film of claim 1, wherein the oxygen barrier material comprises PVDC.

4. The film of claim 1, wherein the oxygen barrier material comprises EVOH.

5. The film of claim 1, wherein the ionomer is neutralized with a sodium cation.

6. The film of claim 5, wherein the neutralization ratio is at least 50%.

7. The film of claim 1, wherein the inner layer comprises a blend of two ethylene alpha olefin copolymers with density less than 0.905 g/cc.

8. The film of claim 1, wherein the inner layer comprises a blend of two ethylene alpha olefin copolymers with densities less than 0.900 g/cc.

9. The film of claim 1, wherein the inner layer comprises less than 50% per weight of EVA copolymer.

10. The film of claim 1, wherein the oxygen barrier material layer is located in the intermediate layer.

* * * * *